United States Patent [19]

Demmler et al.

[11] 3,894,984

[45] July 15, 1975

[54] MANUFACTURE OF CURABLE POLYESTER MOLDING COMPOSITIONS

[75] Inventors: Kurt Demmler; Wolfgang Koser; Anton Hesse, all of Ludwigshafen, Germany

[73] Assignee: BASF Aktiengesellschaft, Ludwigshafen, Germany

[22] Filed: Mar. 4, 1974

[21] Appl. No.: 447,917

[30] Foreign Application Priority Data
Mar. 8, 1973  Germany.............................. 2311395

[52] U.S. Cl................ 260/40 R; 260/863; 260/865; 260/869
[51] Int. Cl............................................. C08g 51/04
[58] Field of Search........... 260/865, 869, 863, 40 R

[56] References Cited
UNITED STATES PATENTS
3,538,188  11/1970  Fekete et al........................ 260/865

Primary Examiner—Donald E. Czaja
Assistant Examiner—S. M. Person
Attorney, Agent, or Firm—Johnston, Keil, Thompson & Shurtleff

[57] ABSTRACT

A process for the manufacture of curable unsaturated polyester molding compositions. To a mixture of
a. at least one unsaturated polyester,
b. at least one copolymerizable olefinically unsaturated compound,
c. an alkaline earth metal oxide and/or hydroxide,
d. at least one inhibitor and, optionally,
e. conventional fillers, reinforcing agents, inert solvents, polymerization accelerators and/or other auxiliaries conventionally used in the processing of polyester molding compositions, there is added from 0.005 to 1% by weight, based on unsaturated polyester resin (a) plus (b), or at least one compound of the general formula $$Z\,O_n\,X_m$$

where Z denotes hydrogen, deuterium, phosphorus, boron, aluminum, gallium, silicon, germanium, tin, lead, antimony, bismuth, zinc, titanium, zirconium or sulfur and X denotes fluorine, chlorine, bromine, iodine or a mixture thereof and $n$ denotes 0, 1 or 2 and $m$ denotes 2, 3, 4, 5 or 6. The process of the invention is used for rapid thickening of molding compositions of unsaturated polyester resins.

17 Claims, No Drawings

MANUFACTURE OF CURABLE POLYESTER MOLDING COMPOSITIONS

The present invention relates to a process for the manufacture of curable polyester molding compositions containing alkaline earth metal oxides in addition to conventional additives and auxiliaries and in which specific active additives are also used to accelerate thickening of said compositions.

Molding compositions of unsaturated polyester resins usually contain unsaturated polyesters, monomeric vinyl compounds copolymerizable therewith, polymerization initiators and inhibitors and, frequently, powdered fillers and glass fibers or glass fiber web structures. In order to obtain non-tacky products showing optimum flow under the curing conditions required, small amounts of finely divided alkaline earth metal oxide are added to the polyester molding compositions before the fillers are added. This causes thickening of the composition due to salt formation with the carboxyl end groups of the unsaturated polyester and the formation of a complex. However, this maturing process is often lengthy and can take up to a number of weeks and thus hampers economical and rapid processing, since it demands the storage of major quantities if shaped articles are to be produced continuously.

A large number of additives for accelerating the viscosity increase of unsaturated polyester resins containing MgO is known. For example, German Pat. No. 1,198,551 discloses that water, when present in low concentration, shortens the time taken for the resin to thicken, but it also reduces the final viscosity and thus frequently produces products which are not entirely free from tackiness. Other known additives, for example, are those consisting of dicarboxylic anhydrides such as hexahydrophthalic anhydride, as disclosed in U.S. Pat. No. 3,465,061, and those consisting of carboxylic acids, carboxylic halides, acid phosphorous esters or their halides and sulfonic acids and sulfonic halides, as disclosed in British Pat. No. 1,058,460.

It is an object of the present invention to provide a process in which the said maturing process takes place at a faster rate and the said acceleration is reproducible, without there being any impairment of the stability or lowering of the final viscosity of the thickened composition.

We have found, surprisingly, that it is possible to reproducibly accelerate thickening of unsaturated polyester resins by means of specific halo compounds which are effective in amounts of less than 0.1%, without impairing the stability or lowering the final viscosity of the thickened composition.

The invention relates to a process for the manufacture of unsaturated polyester molding compositions which are curable in the presence of conventional polymerization initiators and which are based on a mixture of a. at least on unsaturated polyester,
b. at least one copolymerizable olefinically unsaturated compound,
c. an alkaline earth metal oxide and/or hydroxide,
d. at least one inhibitor and, optionally,
e. conventional fillers, reinforcing agents, inert solvents, polymerization accelerators and/or other auxiliaries conventionally used in processing polyesters molding compositions, wherein from 0.005 to 1% by weight (based on unsaturated polyester resin (a) plus (b)) of at least one compound (f) of the general formula $$Z\ O_n\ X_m$$

where Z denotes hydrogen, deuterium, phosphorus, boron, aluminum, gallium, silicon, germanium, tin, lead, antimony, bismuth, zinc, titanium, zirconium or sulfur and X denotes fluorine, chlorine, bromine, iodine or a mixture thereof, and $m$ denotes 0, 1 or 2 and $m$ denotes 2, 3, 4, 5 or 6, is added.

In a preferred embodiment of the process of the invention, a compound having at least one hydroxyl group is also added. Particularly preferred is an embodiment in which the compound (f) of the general Formula $Z\ O_n\ X_m$ is at least one compound selected from the group consisting of HCl, HBr, PCl$_3$, POCl$_3$, SOCl$_2$, SO$_2$Cl$_2$, SiCl$_4$, SnCl$_4$ and TiCl$_4$ and the compound having at least one hydroxyl group is at least one compound selected from the group consisting of water, methanol, ethanol, isopropanol, n-propanol, butanol, ethylene glycol and propylene glycol-1,2.

A particularly advantageous embodiment of the present invention consists in adding the compound (f) of the general formual $Z\ O_n\ X_m$ to a solution of unsaturated polyester (a) in (b) or in an inert solvent before or during mixing with the components (b) to (e).

The reaction of unsaturated polyester resins with magnesium oxides shows better reproducibility and is more rapid when said polyester resins already contain magnesium attached in the manner of a salt to the carboxyl groups of the polyester (see German Pat. No. 1,209,738) but is was not foreseeable that the reactivity of these products, which may be prepared for example by partial reaction of the polyester carboxyl groups with magnesium oxide, is raised considerably by the use of the halo compounds (f) proposed by the present invention.

The following comments relate to the individual components of the molding compositions which may be used in the process of the present invention.

a. Suitable unsaturated polyesters are the usual polycondensates of polybasic and in particular dibasic carboxylic acids and their esterifiable derivatives, combined in the manner of an ester with polyhydric and in particular dihydric alcohols and, optionally, additionally containing radicals of monobasic carboxylic acids and/or radicals of monohydric alcohols and/or radicals of hydroxycarboxylic acids, at least a portion of these radicals possessing ethylenically unsaturated copolymerizable groups.

Examples of polyhydric and in particular dihydric, saturated or unsaturated alcohols are the usual alkanediols and oxa-alkanediols containing acyclic groups, cyclic groups or both, such as ethylene glycol, propylene glycol-1,2, propanediol-1,3, butylene glycol-1,3, butanediol-1,4, hexanediol-1,6, 2,2-dimethylpropanediol-1,2, diethylene glycol, triethylene glycol, polyethylene glycol, cyclohexanediol-1,2, 2,2-bis-(p-hydroxycyclohexyl)-propane, neopentyl glycol, 1,4-bis-methylolcyclohexane, vinyl glycol, trimethylolpropane monoallyl ether and 1,4-butenediol. The co-use, in minor quantities, of monohydric, trihydric and other polyhydric alcohols, such as ethyl hexanol, fatty alcohols, benzyl alcohols, 1,2-di-(allyloxy)propanol-3, glycerol, pentaerythritol and trimethylolpropane is also possible. The polyhydric and in particular dihydric alcohols are reacted with polybasic and in particular dibasic carboxylic acids or their condensible derivatives generally in stoichiometric or substantially stoichiometric amounts.

Suitable carboxylic acids or derivatives thereof are dibasic olefinically unsaturated, preferably α,β-olefinically unsaturated carboxylic acids such as maleic acid, fumaric acid, itaconic acid, citraconic acid, methyleneglutaric acid and mesaconic acid or their esters or anhydrides. In addition, other modifying dibasic unsaturated and/or saturated carboxylic acids and dibasic aromatic carboxylic acids, such as succinic acid, glutaric acid, α-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid and hexachloroendomethylenetetrahydrophthalic acid may be contained in the polyester as condensed units, as may also be monobasic and tribasic carboxylic acids and carboxylic acids of even higher basicity, as for example ethylhexanoic acid, fatty acids, methacrylic acid, propionic acid, benzoic acid, 1,2,4-benzenetrioic acid and 1,2,4,5-benzenetetroic acid.

These unsaturated polyesters are generally prepared from their components by melt condensation or condensation under azeotropic conditions.

It has generally been found advantageous to use an unsaturated polyester having an acid number of from 10 to 100 and preferably of from 25 to 60 and an average molecular weight of from about 800 to 4,000.

For details on the composition of unsaturated polyesters see for example H. V. Boenig, "Unsaturated Polyesters: Structure and Properties," Amsterdam, 1964.

The molding compositions of the invention generally contain from 10 to 50% and preferably from 15 to 35% by weight (based on components (a) to (e)) of unsaturated polyesters (a).

b. Suitable copolymerizable olefinically unsaturated monomeric compounds are the vinyl and allyl compounds conventionally used in the manufacture of unsaturated polyester molding compositions, for example styrene, substituted styrenes such as p-chlorostyrene and vinyl toluene, esters of acrylic and methacrylic acids with $C_{1-18}$ alcohols, e.g., methyl methacrylate, butyl acrylate, ethylhexyl acrylate, hydroxypropyl acrylate, dicyclopentadienyl acrylate, butanediol diacrylate and acrylamide, methacrylamide, allyl esters such as diallyl phthalate, and vinyl esters such as vinyl ethylhexanoate and vinyl pivalate.

Mixtures of said olefinically unsaturated monomers are also suitable. The preferred components (b) are styrene, vinyl toluene, α-methylstyrene and diallyl phthalate. The component (b) is present in the molding compositions of the invention generally in an amount of from 15 to 50% and preferably from 20 to 40% by weight, based on the total weight of components (a) and (b).

c. Suitable alkaline earth metal oxides are calcium oxide, calcium hydroxide and, preferably, magnesium oxide or mixtures of said oxides or hydroxides. A portion of said oxide or oxide mixture may be replaced by zinc oxide if desired.

The amount of component (c) in the molding composition of the invention is generally from 0.05 to 10% and preferably from 0.2 to 3%, by weight, based on the total weight of components (a) and (b).

d. Suitable inhibitors are those conventionally used, e.g., hydroquinone, t-butyl catechol, p-benzoquinone, chloranil, nitrobenzenes such as m-dinitrobenzene, thiodiphenylamine and salts of N-nitroso-N-cyclohexylhydroxylamines or mixtures thereof. The inhibitors are present in the molding compositions generally in an amount of from 0.005 to 0.1% and preferably from 0.01 to 0.05% by weight, based on the total weight of components (a) and (b).

e. The molding compositions used in the process of the invention will usually also contain conventional fillers, reinforcing agents and, possibly, inert solvents, polymerization accelerators and/or other auxiliaries normally used in the processing of polyester molding compositions.

Examples of suitable fillers are conventional powdered or granular inorganic or organic fillers such as cement, talcum, kieselguhr, sawdust and wood chips.

Suitable reinforcing materials are inorganic or organic fibers or web structures which, for example, may be structures woven from said fibers, e.g., fibers or structures of glass, asbestos, cellulose and synthetic organic high molecular weight polymers.

The fillers and reinforcing materials may be used in amounts of from 5 to 200% by weight, based on the total weight of components (a) to (d).

Suitable inert solvents, which may also be included if desired, are ketones, esters, hydrocarbons, in amounts of up to 100% by weight, based on component (a), and examples of other materials which may be included are antishrink agents, such as thermoplastic polymers, e.g. polystyrene, styrene copolymers, polyvinyl acetate and poly(meth)acrylates in amounts of up to about 15% by weight based on the total weight of compounds (a) and (b), and also polymerization accelerators.

f. According to the invention, there is added to the molding compositions at least one compound of the general formula $$Z\ O_n\ X_m$$

where Z stands for hydrogen, deuterium, boron, phosphorus, aluminum, gallium, silicon, germanium, tin, lead, antimony, bismuth, zinc, titanium, zirconium or sulfur, X stands for fluorine, chlorine, bromine, iodine or a mixture thereof and $n$ denotes 0, 1 or 2 and $m$ denotes 2, 3, 4, 5 or 6. Suitable substances of this kind are for example oxyhalo compounds, phosphorus and sulfur halides and metal halides of the Lewis acid type. Preferred additives of the general formula $Z\ O_n\ X_m$ are HCl, HBr, $PCl_3$, $POCl_3$, $SOCl_2$, $SO_2Cl_2$, $SiCl_4$, $SnCl_4$ and $TiCl_4$. There halo compounds are added to the molding compositions generally in amounts of from 0.005 to 1% and preferably from 0.04 to 0.2%, by weight of the unsaturated polyester resin (a) plus (b).

A comparison of the effectiveness of these additives and of those known to accelerate the viscosity increase of the molding compositions (see Tables 1 and 2 below) shows that the additives (f) proposed by the invention (Table 1, No. 1 and Table 2, Nos. 2. to 7) are distinctly superior to said known additives (Table 1, No. 2 and Table 2, Nos. 8 to 14); the viscosity of the batches containing the halo compounds (f) rises at a faster rate. The excellent accelerating action, even at room temperature, is shown by Table 3, in which results obtained with an unsaturated polyester resin (resin B) containing magnesium oxide and phosphorus trichloride are compared with similar tests in which the phosphorus trichloride is omitted. Both the viscosities obtained at 55°C and those obtained at 22°C surprisingly show differences of several tenth powers.

There are various ways of combining the halo compounds (f) of the invention with the unsaturated polyester and alkaline earth metal oxide or hydroxide.

One advantageous method, for example, is to mix the, in most cases, inhibitor-containing unsaturated polyester resin (a) plus (b) plus (d) containing a deficiency of magnesium oxide, e.g., an amount of from 0.2 to 0.4% of MgO (based on the unsaturated polyester resin (a) plus (b)) with the halo compounds (f) and to treat the mixture at temperatures of from about 10° to 100°C and preferably from 40° to 80°C for from 5 to 120 minutes. The resulting activated resin mixture shows very good stability on storage and is then mixed by the processor with, advantageously, a further amount of alkaline earth metal oxide or hydroxide and optionally with a further amount of components (f), fillers and reinforcing substances as mentioned under (e) above and other auxiliaries and additives normally employed in processing unsaturated polyester resin compositions as well as the polymerization initiators normally used for curing purposes, whereupon the mixture is cured in the usual manner to give moldings or compression moldings.

However, instead of using the above two-stage method, it is possible to effect mixing of components (a) to (f) in a single operation, the individual components being added in any desired order, i.e., component (f) may be added last if desired. Usually, it is advantageous to mix the polyester resin with the halo compound (f) and then to mix in the magnesium oxide and other components.

Similarly, the unsaturated polyester (a), dissolved in an inert solvent such as acetone or ethyl acetate, may be first combined with the halo compound (f), whereupon the alkaline earth metal oxide or hydroxide is added followed by component (b), e.g., styrene, diallyl phthalate or a normally solid polymerizable substance such as a diallyl phthalate prepolymer or acrylamide, and the other components (fillers, reinforcing substances, etc.) and the initiator, and the inert solvent is finally evaporated off.

Table 4 clearly shows that the activity increase, measured in terms of viscosity increase with time, is not primarily caused by the magnesium already present as an intergral part of the unsaturated polyester resin but is due to the presence of the halide, e.g, phosphorus trichloride (see Examples A and B compared with C, D, E and F in Table 4).

The results listed in Table 5 (resin C plus 1.07% of MgO) show that reactions of unsaturated polyesters with MgO in inert solvents are also strongly assisted by the present small additions of halo compounds (f).

It is well known that the reaction of unsaturated polyester resins with magnesium hydroxide is accelerated by additions of polyalcohols, e.g., glycerol (U.S. Pat. No. 3,631,144) and that thickening of MgO-containing polyester resins is accelerated by the additions of water (German Pat. No. 1,198,551), but is has been found, surprisingly, that by combining compounds having at least one hydroxyl group with the specific halo compounds (f) a synergistic effect as regards thickening of the unsaturated polyester resin containing magnesium oxide is achieved. This method makes it possible to shorten the maturing period of the molding compositions considerably and to control the rise in viscosity of MgO-containing unsaturated polyester resins by regulating the concentration of the hydroxyl compound. Furthermore, there is the possibility of utilizing highly reactive systems for the preparation of prepregs, which systems nevertheless have an adequate pot life. For example, the halo compound (f) is added to a MgO-containing unsaturated polyester resin and a hydroxyl-containing compound, alone or in admixture with unsaturated polyester resin or a liquid vinyl compound, is added just prior to impregnation of glass mats with said mixture. The viscosity then rises very quickly (see results given in Tables 6 to 8).

Apart from water, suitable compounds containing at least one hydroxyl group are organic hydroxyl-containing compounds of the general formula ROH, where R denotes a straight-chain or branched-chain aliphatic or cycloaliphatic radical, e.g., $-CH_3$, $-C_2H_5$, $-C_3H_7$ and $-C_4H_9$, or of the formula $R'(OH)_x$, where R' denotes $-CH_2-CH_2-$, $-CH_2-CH(CH_3)-$ and $-CH_2-CH-CH_2-$ and $x$ denotes one of the integers 2 to 4. Preferred compounds are methanol, ethanol and isopropanol.

Our method is particularly suitable for the continuous production of shaped articles from unsaturated polyester compositions which, unlike the products of conventional manufacturing processes, may be processed in very short maturing times, for example on a conveyor belt. The two-stage reaction of unsaturated polyester resins with MgO may also be carried out, in principle, such that in a first stage there is partial reaction of the carboxyl end groups in the presence of, say, one of the halo compounds of the invention and in the second stage final thickening is carried out with magnesium oxide and a compound containing at least one hydroxyl group. Alternatively, the additives may be added to the last reaction stage only.

The concentration of the halo compounds (f) of the invention varies from about 0.01 to 1% and preferably from 0.04 to 0.2%, whilst that of the hydroxyl compounds is generally from 0.05 to 5% and preferably from 0.1 to 2% by weight, based on the weight of unsaturated polyester resin (a) plus (b) in the molding composition.

Mixing of the individual components is carried out in conventional mixing units such as roller mills and kneaders.

For the purpose of curing the molding compositions produced by the process of the invention, the latter are mixed with polymerization initiators such as are commonly used in unsaturated polyester resins, particularly those showing optimum stability at room temperature and dissociating into polymerization-initiating free radicals at elevated temperature. Examples of suitable initiators are peroxides such as benzoyl peroxide, dicumyl peroxide, di-t-butyl peroxide, t-butyl perbenzoate and azo compounds such as azodiisobutyronitrile and mixtures of said initiators. The amount of initiator in the molding compositions of the invention is generally from 0.5 to 6% and preferably from 1 to 3%, by weight of the total weight of components (a) and (b).

The molding compositions produced in the process of the invention may be processed in a large number of ways, for example by the application of pressure and heat (hot compression molding, injection molding).

In the following Examples the part and percentages are by weight.

EXAMPLE 1

Tests on the effectiveness of various additives on the reaction of magnesium oxide with unsaturated polyester resin A Resin A is a 66% styrene solution of an unsaturated polyester (C) of maleic acid, o-phthalic acid and propylene glycol-1, 2in a molar ratio of 2 : 1 : 3.15, said solution being stabilized with 0.01% of hydroquinone. The acid number of the unsaturated polyester is 50.

a. Mixtures of this resin with 2% of magnesium oxide and 0.08% of phosphorus trichloride, hexahydrophthalic anhydride or no further additive were treated at 22°C in such a manner that there was no evaporation of the styrene and no settling of the magnesium oxide. After 0.7 hr and after 24 hrs the viscosity was measured by means of a rotary viscosimeter or, at values above $4 \times 10^5$ centipoise, with a "Konsistometer" (manufactured by Haake, Berlin). The results are listed in Table 1 below.

TABLE 1

Reaction of resin A with 2% of "magnesium oxide, light" (Merck) at 22°C in the presence of additives

| No. | Additive [%] | Viscosity [centipoise] after | | |
|---|---|---|---|---|
| | | 0 hr | 7 hrs | 24 hrs |
| 1 | phosphorus trichloride [0.08] | $8.5 \times 10^2$ | $1.2 \times 10^5$ | $1.3 \times 10^7$ |
| 2 | hexahydrophthalic anhydride [0.08] | $8.5 \times 10^2$ | $2.1 \times 10^3$ | $4.0 \times 10^4$ |
| | none | $8.5 \times 10^2$ | $2.2 \times 10^3$ | $3.6 \times 10^5$ | b. Resin A, 1.18% of magnesium oxide (DAB 6, Merck) and 0.04% of activating additives were mixed together and maintained at 56°C for 2 hours with stirring. The viscosities determined with a rotary viscosimeter at 25°C are listed in Table 2 below:

TABLE 2

Reaction of resin A with 1.18% of magnesium oxide (DAB 6, Merck) and 0.04% of activating additives. Reaction conditions: 2 hrs at 56°C

| No. | Additive | Viscosity in centipoise at 25°C |
|---|---|---|
| 1 | none | $5.0 \times 10^3$ |
| 2 | phosphorus trichloride | $2.2 \times 10^5$ |
| 3 | phosphorus oxytrichloride | $2.0 \times 10^5$ |
| 4 | titanium(IV) chloride | $1.5 \times 10^5$ |
| 5 | tin(IV) chloride | $5.0 \times 10^4$ |
| 6 | silicon(IV) chloride | $9.0 \times 10^4$ |
| 7 | aluminum chloride (anhydrous) | $5.2 \times 10^4$ |
| 8 | glacial acetic acid | $2.3 \times 10^4$ |
| 9 | chloroacetic acid | $1.8 \times 10^4$ |
| 10 | acetyl chloride | $6.0 \times 10^3$ |
| 11 | acetic anhydride | $1.3 \times 10^4$ |
| 12 | phosphorous butyl ester dichloride | $3.8 \times 10^3$ |
| 13 | p-toluenesulfonic acid | $2.6 \times 10^4$ |
| 14 | p-toluenesulfonyl chloride | $1.0 \times 10^4$ |
| 15 | trichloroethyl phosphite | $4.7 \times 10^3$ |

EXAMPLE 2

Mixtures of resin B and 1.18% of magnesium oxide (DAB 6, Merck) were maintained at 55° and 23°C, with and without 0.055% of phosphorus trichloride, stirring being effected to prevent settling of the oxide. Resin B is a 65% styrene solution of an unsaturated polyester of maleic acid and propylene glycol-1,2 having an acid number of 30 and stabilized with 0.01% of hydroquinone.

TABLE 3

Reaction of resin B at different temperatures with 1.18% of magnesium oxide (DAB 6, Merck). Initial viscosity $3.00 \times 10^3$ centipoise.

| Additive | [%] | Temperature (°C) | Reaction time (hrs) | Viscosity (centipoise) |
|---|---|---|---|---|
| none | | 55 | 3 | $9.0 \times 10^3$ |
| phosphorus trichloride | 0.055 | 55 | 3 | $3.18 \times 10^7$ |
| none | | 23 | 19 | $6.9 \times 10^3$ |
| phosphorus trichloride | 0.055 | 23 | 19 | $8.4 \times 10^6$ |

EXAMPLE 3

Tests on the two-stage reaction of resin A with magnesium oxide with and without additives In the first stage, samples of resin A were treated at 80°C and 22°C with 0.4% of magnesium oxide, in some cases in the presence of 0.08% of phosphorus trichloride. The resulting products were then treated in the second stage with 2% of magnesium oxide and, in some cases, with 0.08% of phosphorus trichloride. The resulting viscosity was measured after 7 and after 24 hours at the reaction temperature. The results are listed in Table 4 below.

TABLE 4

Two-stage reaction of resin A with "magnesium oxide, light" with and without the addition of phosphorus trichloride

| Stage I Test | A | B | C | D | E | F |
|---|---|---|---|---|---|---|
| MgO (%) | — | 0.4 | — | 0.4 | 0.4 | 0.4 |
| PCl$_3$ (%) | — | — | — | — | 0.08 | 0.08 |
| Temperature (°C) | — | 80 | — | 80 | 80 | 22 |
| Time (hrs) | — | 2 | — | 2 | 2 | 20 |
| Viscosity (20°C) (centipoise) | $8.5 \times 10^2$ | $1.65 \times 10^3$ | $8.5 \times 10^2$ | $1.6 \times 10^3$ | $1.6 \times 10^3$ | $1.6 \times 10^3$ |

TABLE 4 — Continued

Two-stage reaction of resin A with "magnesium oxide, light" with and without the addition of phosphorus trichloride

| Stage I Test | A | B | C | D | E | F |
|---|---|---|---|---|---|---|
| Stage II |  |  |  |  |  |  |
| MgO (%) | 2 | 2 | 2 | 2 | 2 | 2 |
| PCl$_3$ (%) | — | — | 0.08 | 0.08 | — | — |
| Temperature (°C) | 22 | 22 | 22 | 22 | 22 | 22 |
| Viscosity (22°C) (centipoise) |  |  |  |  |  |  |
| after 7 hours | $2.2 \times 10^3$ | $5.5 \times 10^3$ | $1.2 \times 10^5$ | $2.6 \times 10^6$ | $5.6 \times 10^6$ | $1.15 \times 10^6$ |
| after 24 hours | $3.6 \times 10^5$ | $3.6 \times 10^5$ | $1.3 \times 10^7$ | $6.4 \times 10^7$ | $2.58 \times 10^7$ | $1.85 \times 10^7$ |

EXAMPLE 4

The unsaturated polyester (C) of maleic acid, o-phthalic acid and propylene glycol-1,2 contained in resin (A) (Example 1) and having an acid number of 50 was dissolved in 40% of acetone. The viscosity of the solution at 20°C was about 35 centipoise. A number of samples of this solution were each mixed with 1.07% of magnesium oxide and some with 0.04% of an activating additive, and all were heated under reflux. Table 5 below lists the viscosities measured at 20°C after 1 hour.

TABLE 5

| Additive | (%) | Viscosity (centipoise) after 1 hr at 20°C |
|---|---|---|
| none |  | $4.0 \times 10^2$ |
| water | 0.04 | $1.3 \times 10^3$ |
| 35% hydrochloric acid | 0.04 | $3.8 \times 10^4$ |
| aluminum chloride (anhydr.) | 0.04 | $1.6 \times 10^5$ |

EXAMPLE 5

100 parts of resin (A) (cf. Example 1) containing 0.08% of phosphorus oxytrichloride and 0.01% of thiodiphenylamine, 150 parts of chalk, 3 parts of titanium dioxide, 4 parts of zinc stearate, 1.5 parts of "magnesium oxide, light, pure" (Merck) and 3 parts of 50% t-butyl perbenzoate are mixed together and the resulting composition is used to impregnate glass mats which were then rolled up between polyethylene films. After the mats had matured for from 2 to 3 days (glass content 28%), shaped articles were made therefrom by applying a pressure of 70 kg/cm$^2$ at 150°C to give hard, non-tacky and insoluble shaped products.

EXAMPLE 6

Mixtures of resin A and 2% of "magnesium oxide, light" were mixed with 0.5% of methanol and/or 0.08% of phosphorus oxytrichloride and maintained at 23°C for observation of the rise in viscosity with time. Values of up to $4.0 \times 10^5$ centipoise were determined using a rotary viscosimeter and higher values were determined with a "Konsistometer" (Haake, Berlin). The results are listed in Table 6 below. Resin A, a 65% styrene solution of an unsaturated polyester of maleic acid and propylene glycol 1,2 in a molar ratio of 1 : 1 and having an acid number of 30 is stabilized with 0.01% of hydroquinone.

TABLE 6

Reaction of resin A with 2% of "magnesium oxide, light" and different additives at 23°C

| Additive | (%) | Viscosity (centipoise) after X hours |  |  |  |
|---|---|---|---|---|---|
|  |  | X = 0 | 2 | 5 | 24 |
| phosphorus oxytrichloride | 0.08 | $1.8 \times 10^3$ | $2.8 \times 10^3$ | $9.1 \times 10^3$ | $4.2 \times 10^8$ |
| methanol | 0.5 | $1.8 \times 10^3$ | $1.8 \times 10^3$ | $2.4 \times 10^3$ | $5.65 \times 10^6$ |
| phosphorus oxytrichloride | 0.08 | $1.8 \times 10^3$ | $3.2 \times 10^3$ | $2.0 \times 10^7$ | $8.9 \times 10^8$ |
| methanol | 0.5 |  |  |  |  |

EXAMPLE 7

Mixtures of resin B and 2% of "magnesium oxide, light" were mixed with 0.5% of methanol and/or 0.08% of phosphorus oxytrichloride and maintained at 22°C for observation of the viscosity rise with time. The testing conditions prevented settling of the magnesium oxide. Resin B is a 65% styrene solution of an unsaturated polyester of maleic acid, o-phthalic acid and propylene glycol-1,2 in a molar ratio of 2 : 1 : 3, has an acid number of 18 and is stabilized with 0.01% of hydroquinone. Table 7 lists the results of the tests.

TABLE 7

Reaction of resin B with 2% of "magnesium oxide, light" and different additives at 22°C

| Additive | (%) | Viscosity (centipoise) after X hours |  |  |  |  |  |
|---|---|---|---|---|---|---|---|
|  |  | X = 0.0 | 0.25 | 0.5 | 0.75 | 2 | 4 |
| phosphorus oxytrichloride | 0.08 | $2.8 \times 10^3$ | — | — | — | $8.0 \times 10^3$ | $2.24 \times 10^6$ |
| methanol | 0.5 | $2.8 \times 10^3$ | — | — | — | $5.0 \times 10^3$ | $3.9 \times 10^4$ |
| phosphorus oxytrichloride | 0.08 | $2.8 \times 10^3$ | $3.1 \times 10^3$ | $1.5 \times 10^4$ | $1.8 \times 10^6$ |  |  |
| methanol | 0.5 |  |  |  |  |  |  |

EXAMPLE 8

The rise in viscosity of mixtures of resin C, 2% of "magnesium oxide, light" and different additives was observed with time. The experimental conditions were chosen so as to prevent evaporation of styrene and settling of magnesium oxide. Resin C, 60% styrene solution of an unsaturated polyester of maleic acid, terephthalic acid and propylene-glycol-1,2 in a molar ratio of 1 : 1 : 2 was stabilized with a combination of 0.01% of hydroquinone and 0.01% of trimethyl hydroquinone and had an acid number of 12. The results are listed in Table 8 below.

TABLE 8

Reaction of resin C with 2% of "magnesium oxide, light" and different additives

| Additive | (%) | Reaction temperature (°C) | Viscosity after X hrs (centip.) | | |
|---|---|---|---|---|---|
| | | | X = 2 | 5 | 24 |
| phosphorus oxytrichloride | 0.08 | 23 | $5.0 \times 10^2$ | $6.5 \times 10^2$ | $2.8 \times 10^3$ |
| methanol | 0.35 | 23 | $8.3 \times 10^2$ | $7.8 \times 10^2$ | $2.2 \times 10^3$ |
| phosphorus oxytrichloride | 0.08 } | 23 | $1.34 \times 10^6$ | — | $2.01 \times 10^7$ |
| methanol | 0.35 } | | | | |
| ethylene glycol | 0.35 | 21 | $2.2 \times 10^3$ | $1.6 \times 10^4$ | $3.9 \times 10^5$ |
| phosphorus oxytrichloride | 0.08 } | 21 | $3.1 \times 10^5$ | — | $8.0 \times 10^6$ |
| ethylene glycol | 0.35 } | | | | |
| titanium tetrachloride | 0.08 | 21 | $1.0 \times 10^3$ | $1.0 \times 10^3$ | $1.3 \times 10^3$ |
| titanium tetrachloride | 0.08 } | 21 | $2.1 \times 10^3$ | $3.0 \times 10^5$ (after 4 hrs) | $4.9 \times 10^6$ |
| methanol | 0.35 } | | | | |

EXAMPLE 9

4,000 parts of resin C (cf. Example 3), mixed with 0.08% of phosphorus oxytrichloride and 0.35% of methanol, 4,000 parts of chalk, 80 parts of "magnesium oxide, light, pure" and 40 parts of benzoyl peroxide powder were mixed together and the resulting composition was used to impregnate glass mats which were then rolled up between polyethylene films. The mats were non-tacky after 1 day at room temperature and had a glass content of 28%. They were than cut up and subjected to a pressure of 50 kg/cm² for 5 minutes at 120°C to give hard, insoluble shaped products.

We claim:

1. In a process for the manufacutre of an unsaturated polyester resin molding composition which is curable in the presence of a polymerization initiator and which comprises a mixture of:
   a. at least one unsaturated polyester resin which is a polycondensate consisting essentially of a polybasic carboxylic acid and a polyhydric alcohol as monomeric units, at least a portion of the monomeric units being ethylenically unsaturated;
   b. 15 to 50% by weight, based on the total weight of components (a) and (b), of at least one copolymerizable olefinically unsaturated vinyl or allyl compound;
   c. 0.05 to 10% by weight, based on the total weight of components (a) and (b), of at least one compound selected from the group consisting of calcium oxide, calcium hydroxide and magnesium oxide; and
   d. 0.005 to 0.1% by weight, based on the total weight of components (a) and (b), of at least one polymerization inhibitor, the improvement of accelerating the thickening of said molding composition by adding thereto 0.005 to 1% by weight, based on the total weight of components (a) and (b), at least one compound (f) of the formula $$Z\ O_n\ X_m$$

wherein Z is hydrogen, deuterium, phosphorus, boron, aluminum, gallium, silicon, germanium, tin, lead, antimony, bismuth, zinc, titanium, zirconium or sulfur, X is fluorine, chloride, bromine, iodine or a mixture thereof, and n is the integer 0, 1 or 2 and m is the integer 2, 3, 4, 5 or 6.

2. A process as claimed in claim 1, wherein there is additionally added at least one hydroxyl compound selected from the group consisting of water, methanol, ethanol, isopropanol, n-propanol, butanol, ethylene glycol and propylene glycol-1,2 in an amount of from 0.05 to 5% by weight, based on the total weight of components (a) and (b).

3. A process as claimed in claim 1, wherein said polyester resin molding composition additionally contains at least one substance used in unsaturated polyester molding compositions and selected from the group consisting of fillers, reinforcing substances and inert solvents, wherein fillers and reinforcing substances are added in an amount of from 5 to 200% by weight, based on the total weight of components (a) to (d), and an inert solvent is added in an amount of up to 100% by weight, based on component (a).

4. A process as claimed in claim 3, wherein there is additionally added at least one hydroxyl compound selected from the group consisting of water, methanol, ethanol, isopropanol, n-propanol, butanol, ethylene glycol and propylene glycol-1,2 in an amount of from 0.05 to 5% by weight, based on the total weight of components (a) and (b).

5. A process as claimed in claim 1, wherein component (b) is a compound selected from the group consisting of sytrene, vinyl toluene, α-methylstyrene and diallyl phthalate.

6. A process as claimed in claim 1 wherein the amount of component (b), based on the total weight of components (a) and (b), is 20 to 40% by weight.

7. A process as claimed in claim 5, wherein the amount of component (b), based on the total weight of components (a) and (b), is 20 to 40% by weight.

8. A process as claimed in claim 1, wherein the compound of the formula $Z\ O_n\ X_m$ is at least one compound selected from the group consisting of HCl, HBr, $PCl_3$, $POCl_3$, $SOCl_2$, $SO_2Cl_2$, $SiCl_4$, $SnCl_4$ and $TiCl_4$.

9. A process as claimed in claim 2, wherein the compound of the general formula $Z\ O_n\ X_m$ is at least one compound selected from the group consisting of HCl, HBr, $PCl_3$, $POCl_3$, $SOCl_2$, $SO_2Cl_2$, $SiCl_4$, $SnCl_4$ and $TiCl_4$.

10. A process as claimed in claim 4, wherein the compound of the formula $Z\ O_n\ X_m$ is at least one compound selected from the group consisting of HCl, HBr, $PCl_3$, $POCl_3$, $SOCl_2$, $SO_2Cl_2$, $SiCl_4$, $SnCl_4$ and $TiCl_4$.

11. A process as claimed in claim 1, wherein the compound of the formula $Z\ O_n\ X_m$ is added to a solution of the unsaturated polyester (a) in (b) or in an inert solvent prior to or during mixing with the components (b) to (d).

12. A process as claimed in claim 3, wherein the compound of the formula $Z O_n X_m$ is added to a solution of the unsaturated polyester (a) in (b) or an inert solvent prior to or during mixing with the other components.

13. A process as claimed in claim 4, wherein the compound of the formula $Z O_n X_m$ is added to a solution of the unsaturated polyester (a) in (b) or an inert solvent prior to or during mixing with the other components.

14. A process as claimed in claim 1, wherein the unsaturated polyester molding composition contains, based on the total weight of components (a) and (b),
from 0.2 to 3% by weight of component (c) and
from 0.01 to 0.05% by weight of component (d).

15. A process as claimed in claim 1, wherein the component (c) is magnesium oxide.

16. A process as claimed in claim 1, wherein the compound of the formula $Z O_n X_m$ is added to the unsaturated polyester molding composition in an amount of from 0.04 to 0.2% by weight, based on the total weight of unsaturated polyester resin (a) plus (b).

17. A process as claimed in claim 2, wherein from 0.04 to 0.2% by weight of a compound of the formula $Z O_n X_m$ and from 0.1 to 2% by weight of at least one hydroxyl compound are added to the unsaturated polyester molding compositions, the percentages being based on the total weight of unsaturated polyester resin (a) plus (b).

* * * * *